(12) United States Patent
Lee et al.

(10) Patent No.: US 8,928,599 B2
(45) Date of Patent: *Jan. 6, 2015

(54) TOUCH SENSOR USING CAPACITANCE DETECTION AND LIQUID CRYSTAL DISPLAY HAVING THE SAME

(75) Inventors: Byoung-Jun Lee, Cheonan-si (KR); Min-Koo Han, Seoul (KR); Hyun-Sang Park, Seongnam-si (KR); Bong-Hyun You, Yongin-si (KR)

(73) Assignees: Samsung Display Co., Ltd., Yongin, Gyeonggi-Do (KR); Seoul National University R&DB Foundation, Seoul (KR)

( * ) Notice: Subject to any disclaimer, the term of this patent is extended or adjusted under 35 U.S.C. 154(b) by 673 days.

This patent is subject to a terminal disclaimer.

(21) Appl. No.: 12/814,818

(22) Filed: Jun. 14, 2010

(65) Prior Publication Data

US 2011/0057902 A1    Mar. 10, 2011

(51) Int. Cl.
| G06F 3/041 | (2006.01) |
| G06F 3/044 | (2006.01) |
| G09G 3/36 | (2006.01) |
| G02F 1/1333 | (2006.01) |

(52) U.S. Cl.
CPC .............. *G06F 3/0412* (2013.01); *G06F 3/044* (2013.01); *G09G 3/3648* (2013.01); *G02F 1/13338* (2013.01)

USPC .......................................................... 345/173

(58) Field of Classification Search
USPC .......................................................... 345/173
See application file for complete search history.

(56) References Cited

U.S. PATENT DOCUMENTS

| 8,427,436 | B2 * | 4/2013 | Park et al. ...................... 345/173 |
| 2002/0091952 | A1 * | 7/2002 | Lin et al. ........................ 713/300 |
| 2006/0092143 | A1 * | 5/2006 | Kasai et al. ................... 345/175 |
| 2007/0030255 | A1 * | 2/2007 | Pak et al. ....................... 345/173 |
| 2007/0070056 | A1 * | 3/2007 | Sato et al. ...................... 345/207 |
| 2008/0198143 | A1 * | 8/2008 | Kinoshita et al. ............. 345/175 |
| 2009/0147191 | A1 * | 6/2009 | Nakajima et al. ............. 349/116 |

* cited by examiner

*Primary Examiner* — Long D Pham
(74) *Attorney, Agent, or Firm* — F. Chau & Associates, LLC (57) ABSTRACT

A liquid crystal display panel includes a touch sensor and the touch sensor includes a plurality of x-axis read-out lines, a plurality of y-axis read-out lines crossing the x-axis read-out lines, a plurality of sensor units provided in a plurality of regions defined by the x-axis read-out lines and the y-axis read-out lines. Each sensor unit comprises a reset unit that outputs a sampling voltage based on a reset voltage, a capacitance detector that generates a modified sampling voltage from the sampling voltage based on a variation of a cell gap of the display panel caused by a touch of the display panel, a first output unit that changes an electric potential of a corresponding x-axis read-out line in response to the modified sampling voltage and a second output unit that changes an electric potential of a corresponding y-axis read-out line in response to the modified sampling voltage.

23 Claims, 7 Drawing Sheets

TOUCH SENSOR USING CAPACITANCE DETECTION AND LIQUID CRYSTAL DISPLAY HAVING THE SAME

CROSS-REFERENCE TO RELATED APPLICATIONS

This application claims priority to Korean Patent Application No. 2009-0085471, filed on Sep. 10, 2009 in the Korean Intellectual Property Office (KIPO), the disclosure of which is incorporated by reference in its entirety herein.

BACKGROUND

1. Technical Field

Embodiments of the present invention relate to a touch sensor and a liquid crystal display having the same.

2. Discussion of Related Art

A touch panel includes a screen and a touch sensor to detect the presence and location of a touch within the screen. A user can select an item displayed on the screen using a finger, a hand, or an object, such as a stylus.

A touch panel may be disposed on top of a liquid crystal display panel, which displays an image, to receive input information from a user and detect position information. However, when the touch panel is disposed in this manner, optical characteristics (e.g., brightness, a viewing angle, etc.) of the LCD may be lowered. Further, the thickness of the LCD may be increased to an undesirable size due to the additional thickness of the touch panel.

Thus, there is a need for a touch panel that can be incorporated within a liquid crystal display panel of a liquid crystal display.

SUMMARY

A liquid crystal display panel including a touch sensor according to an exemplary embodiment of the inventive concept includes a plurality of x-axis read-out lines, a plurality of y-axis read-out lines crossing the x-axis read-out lines, and a plurality of sensor units provided in a plurality of regions defined by the x-axis read-out lines and the y-axis read-out lines. Each sensor unit includes a reset unit, a capacitance detector, a first output init, and a second output unit. The reset unit outputs a sampling voltage based on a reset voltage. The capacitance detector generates a modified sampling voltage based on a variation of a cell gap of the display panel caused by a touch of the display panel. The first output unit changes an electric potential of a corresponding x-axis read-out line in response to the modified sampling voltage. The second output unit changes an electric potential of a corresponding y-axis read-out line in response to the modified sampling voltage.

The liquid crystal panel may further include a plurality of first line reset units that output a first source supply voltage to the x-axis read-out lines based on the reset voltage and a plurality of second line reset units that output the first source supply voltage to the y-axis read-out lines based on the reset voltage.

A liquid crystal display panel according to an exemplary embodiment of the invention includes a plurality of sensor units detecting touches of the display panel, a coordinate detection circuit connected to the plurality of sensor units and configured to detect coordinates of a point at which the touch occurs, and a plurality of read-out lines configured to apply an output voltage of the plurality of the sensor units to the coordinate detection circuit. Each sensor unit includes a reset unit, a capacitance detector, and an output unit. The reset unit outputs a sampling voltage based on a reset voltage. The capacitance detector generates a modified sampling voltage from the sampling voltage based on a variation of a cell gap of the display panel caused by the touch. The output unit changes an electric potential of a corresponding read-out line in response to the modified sampling voltage. The reset voltage is commonly applied to the reset units in the plurality of sensor units, and the sampling voltages applied to each of the sensor units formed in the same row have different timing respectively.

The capacitance detector may include a liquid crystal capacitor formed in the liquid crystal display panel. The liquid crystal capacitor may include a first electrode connected to a node which connects a control terminal of the output unit and an output terminal of the reset unit and a second electrode receiving a common voltage.

The liquid crystal panel may include a plurality of line reset units connected to the plurality of read-out lines and applying the output voltage of the sensor units to the coordinate detection circuit.

Each of the line reset units may include a switching unit and a parasitic capacitor outputting a first source supply voltage to a corresponding read-out line based on a read-out clock voltage.

In at least one embodiment of the present invention, a touch sensor including at least one of the above described sensor units can convert a capacitance variation of its liquid crystal capacitor into a variation of a leakage current based on touch events. The touch sensor can magnify a difference between a touch event and a non-touch event to obtain a variation in the quantity of electric charges in parasitic capacitors connected to x- and y-axes read-out lines of the touch sensor. Accordingly, a voltage output from the touch sensor upon receipt of a touch event differs more greatly as compared with a voltage output from the touch sensor when a touch event is not encountered.

A liquid crystal display panel including a touch sensor according to an exemplary embodiment of the invention includes a plurality of read-out lines, a plurality of sensor units arranged in rows and configured to detect a touch of the display panel, and a plurality of sampling voltage lines each connected to a single unique row of the sensor units, and supplying a sampling voltage of a different timing to all sensor units of the row. Each sensor unit includes a reset unit, a capacitance detector, and an output unit. The reset unit receives the sampling voltage from a corresponding one of the sampling voltage lines and outputs the sampling voltage based on a reset voltage. The capacitance detector generates a modified sampling voltage from the sampling voltage based on a variation of a cell gap of the display panel caused by the touch. The output unit changes an electric potential of a corresponding read-out line in response to the modified sampling voltage. The touch sensor is disposed on a thin film transistor substrate of the liquid crystal display panel.

BRIEF DESCRIPTION OF THE DRAWINGS

Exemplary embodiments of the present invention will become readily apparent by reference to the following detailed description when considered in conjunction with the accompanying drawings wherein.

DETAILED DESCRIPTION OF EXEMPLARY EMBODIMENTS

Figure 1:
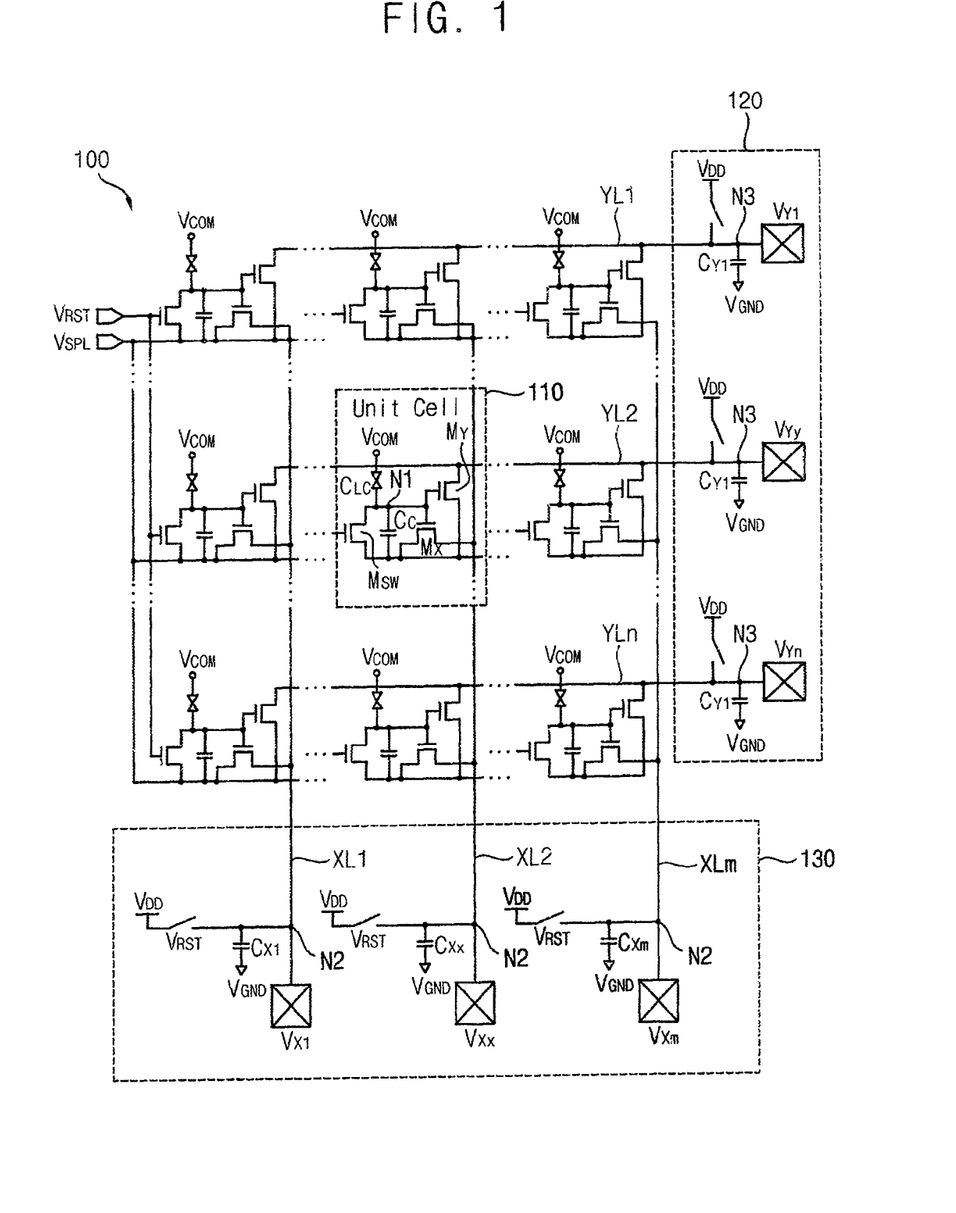
FIG. 1 is a circuit diagram showing a touch sensor according to an exemplary embodiment of the present invention.
Figure 2:
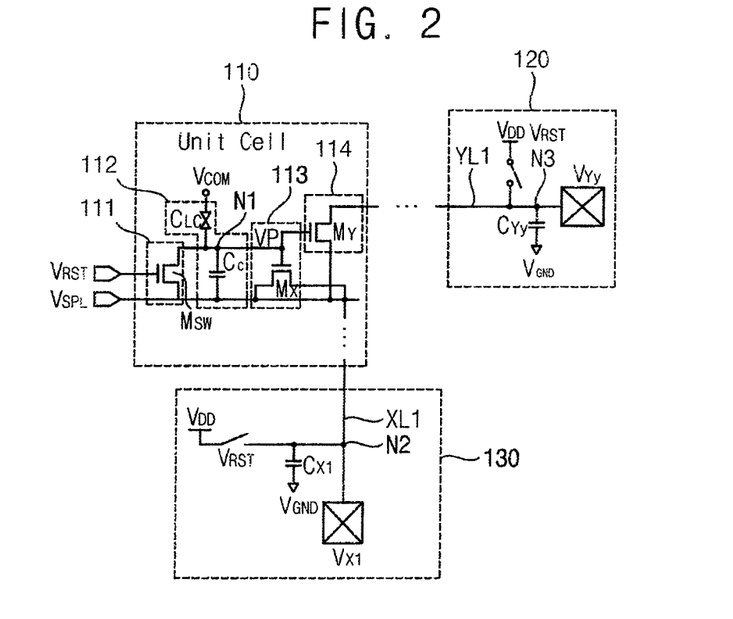
FIG. 2 is a circuit diagram showing a sensor unit, a first line reset unit and a second line reset unit of FIG. 1.

Hereinafter, exemplary embodiments of the present invention will be described in more detail with reference to the accompanying drawings. FIG. 1 is a circuit diagram showing a touch sensor according to an exemplary embodiment of the present invention. FIG. 2 is a circuit diagram showing sensor unit (110), first line reset unit (130) and second line reset unit (120) of FIG. 1.

Referring to FIGS. 1 and 2, a touch sensor 100 includes a plurality of x-axis read-out lines XL1 to XLm, a plurality of y-axis read-out lines YL1 to YLn crossing the x-axis read-out lines XL1 to XLm, and a plurality of sensor units 110. The x-axis read-out lines XL1 to XLm may be insulated from the y-axis read-out lines YL1 to YLn. The plurality of sensor units 110 may be provided in a plurality of areas defined by the x-axis read-out lines XL1 to XLm and the y-axis read-out lines YL1 to YLn.

The touch sensor 100 may be disposed within a liquid crystal display panel (not shown) that displays an image. For example, the touch sensor 100 may be incorporated into a display panel of liquid crystal display such that it rests within the same plane as the display panel. The touch sensor 100 may be selectively formed on a thin film transistor substrate (not shown) of the liquid crystal display panel using a thin film process. The thin film transistor substrate (not shown) may have a plurality of pixels of two substrates of the liquid crystal display panels.

In at least one exemplary embodiment of the present invention, m x-axis read-out lines XL1 to XLm and n y-axis read-out lines YL1 to YLn are provided on the thin film transistor substrate, and m×n sensor units 110 are arranged in a matrix, where m and n are positive integers.

Each sensor unit 110 includes a reset unit 111, a capacitance detector 112, and a first output unit 113 and a second output unit 114. The reset unit 111 includes a first transistor $M_{SW}$ having a control terminal receiving a reset voltage $V_{RST}$, an input terminal receiving a sampling voltage $V_{SPL}$, and an output terminal connected to a first node N1.

Figure 3:
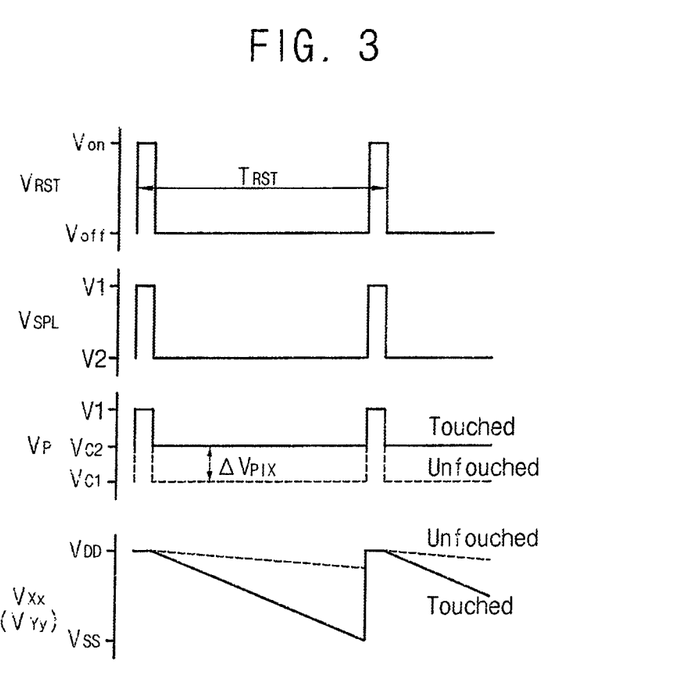
FIG. 3 is an exemplary timing diagram showing waveforms of signals of FIG. 2.

The first transistor $M_{SW}$ is turned on when the reset voltage $V_{RST}$ has a high level during a reset duration. As shown in FIG. 3, the reset voltage $V_{RST}$ has a high duration repeatedly occurring at a predetermined interval. The reset voltage $V_{RST}$ has an on-voltage $V_{on}$ for a high duration, and has an off-voltage $V_{off}$ for a low duration. The capacitance detector 112 includes a liquid crystal capacitor $C_{LC}$ and a coupling capacitor $C_C$. The liquid crystal capacitor $C_{LC}$ includes a first electrode connected to the first node N1 and a second electrode receiving a common voltage $V_{COM}$, and the coupling capacitor $C_C$ includes a first electrode connected to the first node N1 and a second electrode receiving the sampling voltage $V_{SPL}$.

As shown in FIG. 3, the sampling voltage $V_{SPL}$ has the same cycle and phase as that of the reset voltage $V_{RST}$. The electric potential VN1 of the first node N1 has a first potential V1 of the sampling voltage $V_{SPL}$ during the high duration of the reset voltage $V_{RST}$ at an initial period, and when the first transistor Msw is turned off and the sampling voltage $V_{SPL}$ is lowered to a second potential V2, a difference of the electric potential VN1 of the first node N1 ΔVpix ($=V_{G2}-V_{G1}$) may be induced through touch events.

For example, when the touch event does not occur, the capacitance of the liquid crystal capacitor $C_{LC}$ does not change so that the electric potential $V_{N1}$ of the first node N1 is set to a first gate voltage $V_{G1}$. When the touch event occurs, the capacitance of the liquid crystal capacitor $C_{LC}$ increases due to the reduction of a cell gap, so that the electric potential $V_{N1}$ of the first node N1 increases to a second gate voltage $V_{G2}$, which is higher than the first gate voltage $V_{G1}$. When the touch event does not occur, the quantity of charge $Q_{LC}$ in the liquid crystal capacitor $C_{LC}$ can be represented as shown in equation 1 below.

$$Q_{LC} = C_{LC}(V_{G1} - V_{COM}) + C_C(V_{G1} - V_2), \quad \text{(Equation 1)}$$

where $V_{G1}$ refers to the electrical potential VN1 of the first node N1 when no touch event occurs.

The first gate voltage $V_{G1}$ can be obtained by rearranging equation 1 as shown in equation 2 below.

$$V_{G1} = V_{COM} - \frac{C_C}{C_{LC}}[V_{COM} - V_2]. \quad \text{(Equation 2)}$$

When the capacitance of the liquid crystal capacitor $C_{LC}$ is changed by the touch event, the quantity of charge $Q_{LC}'$ in the liquid crystal capacitor CLC can be repesented as shown in equation 3 below.

$$Q_{LC}' = \alpha C_{LC}(V_{G2} - V_{COM}) + C_C(V_{G2} - V_2), \quad \text{(Equation 3)}$$

where $\alpha C_{LC}$ refers to the capacitance of the liquid crystal capacitor $C_{LC}$ changed by the touch event and $V_{G2}$ refers to the electrical potential VN1 of the first node N1 when the touch event occurs.

The second gate voltage $V_{G2}$ can be obtained by rearranging equation 3 as shown in equation 4 below.

$$V_{G2} = V_{COM} - \frac{C_C}{\alpha C_{LC} + C_C}[V_{COM} - V_2]. \quad \text{(Equation 4)}$$

As a result, the difference of electrical potential VN1 of the first node N1 can be represented as shown in equation 5 below.

$$\Delta V_{PIX} = V_{G2} - V_{G1} \quad \text{(Equation 5)}$$
$$= \frac{[\alpha - 1]C_{LC}C_C}{[\alpha C_{LC} + C_C][C_{LC} + C_C]}[V_{COM} - V_2].$$

When a touch event occurs, the electrical potential VN1 of the first node N1 experiences an electrical potential change ΔVpix as expressed in equation 5. Since the amount of the electrical potential change ΔVpix of the first node N1 can be differentiated by the capacitance of the coupling capacitor Cc, the electrical potential change ΔVpix can be increased by changing the capacitance of the coupling capacitor Cc to result in a more sensitive touch sensor 100.

The first output unit 113 includes a second transistor Mx having a control terminal (e.g., gate terminal) connected to the first node N1, an input terminal receiving the sampling voltage $V_{SPL}$, and an output terminal connected to a respective one of the x-axis read-out lines XL1 to XLn. The second output unit 114 includes a third transistor $M_Y$ having a control terminal (e.g., gate terminal) connected to the first node N1, an input terminal receiving the sampling voltage $V_{SPL}$, and an output terminal connected to a respective one of the y-axis read-out lines YL1 to YLm. If a touch event does not occur, the second and third transistors Mx and $M_Y$ are turned off by the first gate voltage $V_{G1}$. However, if a touch event occurs, the second and third transistors Mx and $M_Y$ are turned on by the second gate voltage $V_{G2}$.

Figure 4:
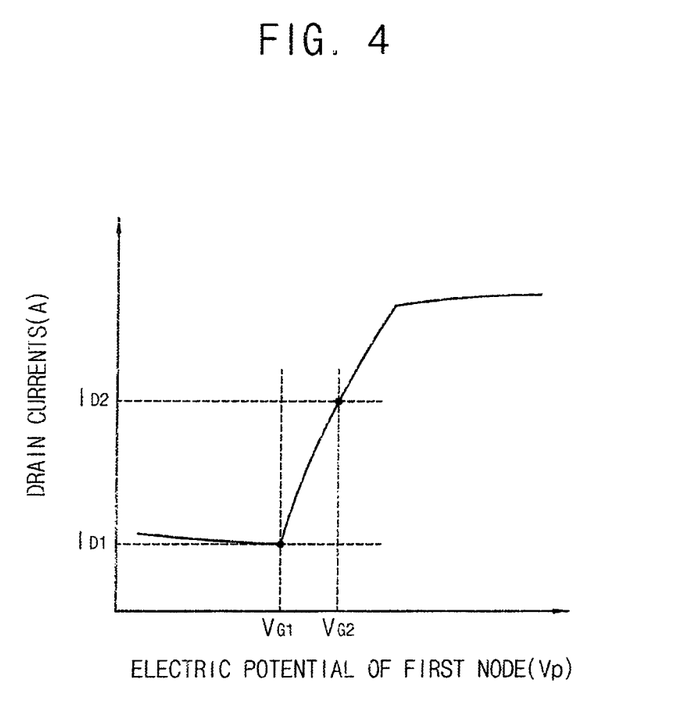
FIG. 4 is an exemplary graph showing a variation of drain currents of transistors as a function of an electric potential of a first node of FIG. 2.

FIG. 4 is an exemplary graph showing a variation of drain currents of the second and third transistors Mx and $M_Y$ as a function of the electric potential $V_p$ of the first node N1. Referring to FIG. 4, if the electric potential $V_p$ of the first node N1 rises from the first gate voltage $V_{G1}$ to the second gate voltage $V_{G2}$, the drain currents of the second and third transistors Mx and $M_Y$ exponentially rise from a first current value $I_{D1}$ to a second current value $I_{D2}$.

The increase of the drain currents of the second and third transistors Mx and $M_Y$ means that a current value leaking through the second and third transistors Mx and $M_Y$ increases. Accordingly, as shown in FIGS. 2 and 3, if the touch event occurs, the drain current rises higher as compared to when the touch event does not occur. Accordingly, an electric potential $V_{N2}$ of a second node N2 disposed on a respective one of the x-axis read-out lines XL1 to XLm and an electric potential $V_{N3}$ of a third node N3 disposed on a respective one of the y-axis read-out lines YL1 to YLn decrease.

Referring again to FIG. 1, the touch sensor 100 includes a plurality of first line reset units 130 corresponding to the x-axis read-out lines XL1 to XLm and a plurality of second line reset units 120 corresponding to the y-axis read-out lines YL1 to YLn.

The first line reset units 130 output a first source supply voltage $V_{DD}$ to the x-axis read-out lines XL1 to XLm based on the reset voltage $V_{RST}$, and the second line reset units 120 output the first source supply voltage $V_{DD}$ to the y-axis read-out lines YL1 to YLn based on the reset voltage $V_{RST}$.

The first line reset units 130 includes a plurality of x-axis parasitic capacitors Cx receiving the reset voltage $V_{RST}$ and connected to the x-axis read-out lines. The second line reset units 120 includes y-axis parasitic capacitors $C_Y$ receiving the reset voltage $V_{RST}$ and connected to the y-axis read-out lines. The x-axis parasitic capacitors and the y-axis parasitic capacitors Cx and $C_Y$ have a capacitance that is larger than that of the liquid crystal capacitor $C_{LC}$.

As shown in FIG. 3, switching elements formed in the first line reset unit 130 and the second line reset unit 120 are turned on during a high duration of the reset voltage $V_{RST}$ so that some electron charges are charged to the x-axis parasitic capacitor Cx and the y-axis parasitic capacitor $C_Y$ at an initial period.

When a touch event occurs at a point within an area of a sensor unit 110, the drain current of the corresponding second transistor Mx increases so that the quantity of charges in the x-axis parasitic capacitor Cx connected to the corresponding x-axis read-out line is reduced. Similarly, the drain current of the corresponding third transistor $M_Y$ also increases so that the quantity of charges in the y-axis parasitic capacitor $C_Y$ connected to the corresponding y-axis read-out line is reduced.

If the quantity of charges of the x- and y-axes parasitic capacitors Cx and Cy corresponding to a point in which a touch event occurs is reduced, the electric potentials $V_{N2}$ and $V_{N3}$ of the second and third nodes N2 and N3 are gradually reduced from the first source supply voltage $V_{DD}$. The electric potentials $V_{N2}$ and $V_{N3}$ of the second and third nodes N2 and N3 corresponding to points in which touch events occur are reduced significantly more than electric potentials of nodes corresponding to points in which touch events do not occur.

Although not shown in FIGS. 1 to 3, comparators may be connected to the x-axis read-out lines XL1 to XLm and the y-axis read-out lines YL1 to YLn to compare the electric potentials $V_{N2}$ and $V_{N3}$ of the second and third nodes N2 and N3 with a preset reference voltage Vref. Accordingly, if the electric potentials $V_{N2}$ and $V_{N3}$ of the second and third nodes N2 and N3 are greater than the preset reference voltage Vref, it may be determined that the touch event has not occurred. If the electric potentials $V_{N2}$ and $V_{N3}$ of the second and third nodes N2 and N3 are less than the preset reference voltage Vref, it may be determined that the touch event has occurred.

A coordinate detection circuit according to an exemplary embodiment of the invention that may be disposed external to the liquid crystal display panel to receive outputs of the touch sensor 100 and detect coordinates of a point in which a touch event occurs will be described later in more detail with reference to FIG. 5.

Since the x- and y-axes parasitic capacitors Cx and Cy may have a capacitance greater than that of the liquid crystal capacitor $C_{LC}$ as described above, even if the capacitance of the liquid crystal capacitor $C_{LC}$ is slightly changed due to a touch operation, the electric potentials $V_{N2}$ and $V_{N3}$ of the second and third nodes N2 and N3 may be greatly changed. The variation of the electric potentials $V_{N2}$ and $V_{N3}$ of the second and third nodes N2 and N3 may be changed according to the capacitance of the x- and y-axes parasitic capacitors Cx and Cy, the first source supply voltage $V_{DD}$, and the sampling voltage $V_{RST}$. As described above, since a voltage variation of read-out terminals increases due to a touch event, sensitivity of the touch sensor 100 can be improved.

Figure 5:
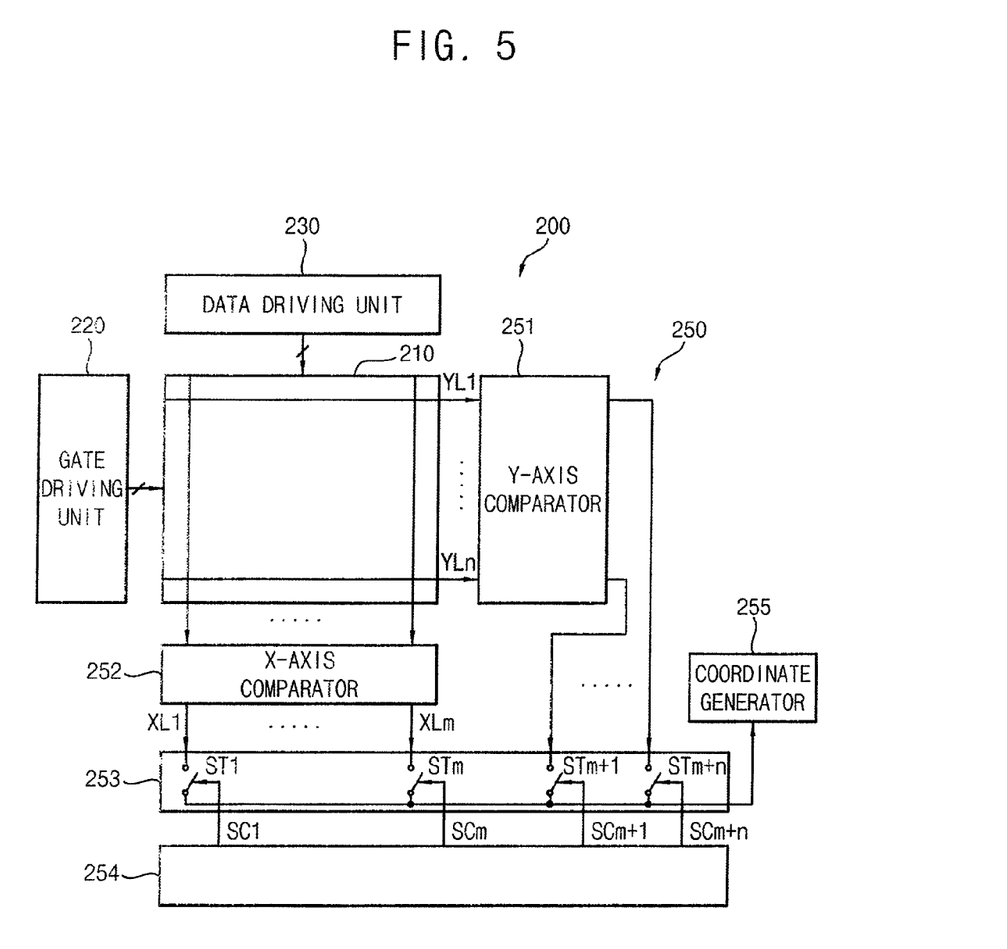
FIG. 5 is a block diagram showing a liquid crystal display according to an exemplary embodiment of the present invention.

FIG. 5 is a block diagram showing a liquid crystal display according to an exemplary embodiment of the present invention. Referring to FIG. 5, the liquid crystal display includes a liquid crystal panel 210, gate driving unit 220 and data driving unit 230.

The liquid crystal panel 210 displays an image with a plurality of pixels. Although not shown in FIG. 5, a plurality of gate lines and a plurality of data lines are formed in the liquid crystal panel 210. Each of the plurality of pixels includes thin film transistor connected to corresponding gate lines and the data lines, and a liquid crystal capacitor connected to an output terminal of the thin film transistor.

The gate driving unit 220 is connected to the plurality of gate lines formed in the liquid crystal panel 210, and applies gate signals to the plurality of gate lines sequentially. The data driving unit 230 is connected to the plurality of data lines, and applies data signals to the plurality of data lines sequentially. When the thin film transistor is turned on in response to the gate signals, the data signals are applied to the liquid crystal capacitor. Electric potential charged in the liquid crystal capacitor in response to the data signals changes the transmittance of the liquid crystal in the liquid crystal panel. Through controlling the transmittance of the liquid crystal, the liquid crystal panel 210 can display images having various grays.

The touch sensor 100 is connected to a coordinate detection circuit 250 to detect coordinates of a point at which a touch event occurs. The coordinate detection circuit 250 includes an x-axis comparator 252 connected to the x-axis read-out lines XL1 to XLm provided in the liquid crystal display panel 210 and an y-axis comparator 251 connected to the y-axis read-out lines YL1 to YLn provided in the liquid crystal display panel 210.

The x-axis comparator 252 may include m first operational amplifiers (OP amplifier) (not shown), where n is a positive integer that corresponds to the number m of x-axis read-out lines XL1 to XLm. Each of the m first OP amplifiers are connected to a corresponding one of the m x-axis read-out lines XL1 to XLm. The first OP amplifiers compare first voltages output from the x-axis read-out lines XL1 to XLm with a preset reference voltage. The y-axis comparator 251 includes n second OP amplifiers (not shown), where n is a positive integer that corresponds to the number n of y-axis read-out lines YL1 to YLn. Each of the n second OP amplifiers are connected to a corresponding one of the y-axis read-out lines YL1 to YLn. The second OP amplifiers compare second voltages output from the y-axis read-out lines YL1 to YLn with the preset reference voltage.

If the voltages $V_{N2}$ and $V_{N3}$ output from the x-axis read-out lines XL1 to XLm and the y-axis read-out lines YL1 to YLn are smaller than the preset reference voltage Vref, the first and second OP amplifiers output first result signals. If the voltages output from the x-axis read-out lines XL1 to XLm and the y-axis read-out lines YL1 to YLn are greater than the preset reference voltage Vref, the first and second OP amplifiers output second result signals, which are different from the first result signals.

The coordinate detection circuit 250 further includes a multiplexer 253, which is connected to both the x-axis comparator 252 and the y-axis comparator 251, and a scan circuit 254 connected to the multiplexer 253.

The multiplexer 253 includes m switching elements ST1 to STm connected to an output terminal of the x-axis comparator 252 and n switching elements STm+1 to STm+n connected to an output terminal of the y-axis comparator 251. Output terminals of the m+n switching elements ST1 to STm+n may be commonly connected to each other. The m+n switching elements ST1 to STm+n may be sequentially turned on in response to m+n switching signals SC1 to SCm+n sequentially applied from the scan circuit 254. The time required to sequentially generate the first switch signal SC1 to the $(m+n)^{th}$ switch signal SCm+n may correspond to one frame.

Accordingly, the multiplexer 253 sequentially outputs signals applied from the x-axis comparator 252 and the y-axis comparator 251 through the m+n switching elements ST1 to STm+n. The coordinate detection circuit 250 further includes a coordinate generator 255 to generate coordinates of a point, at which the touch event occurs, based on the signal sequentially output from the multiplexer 253.

Figure 6:
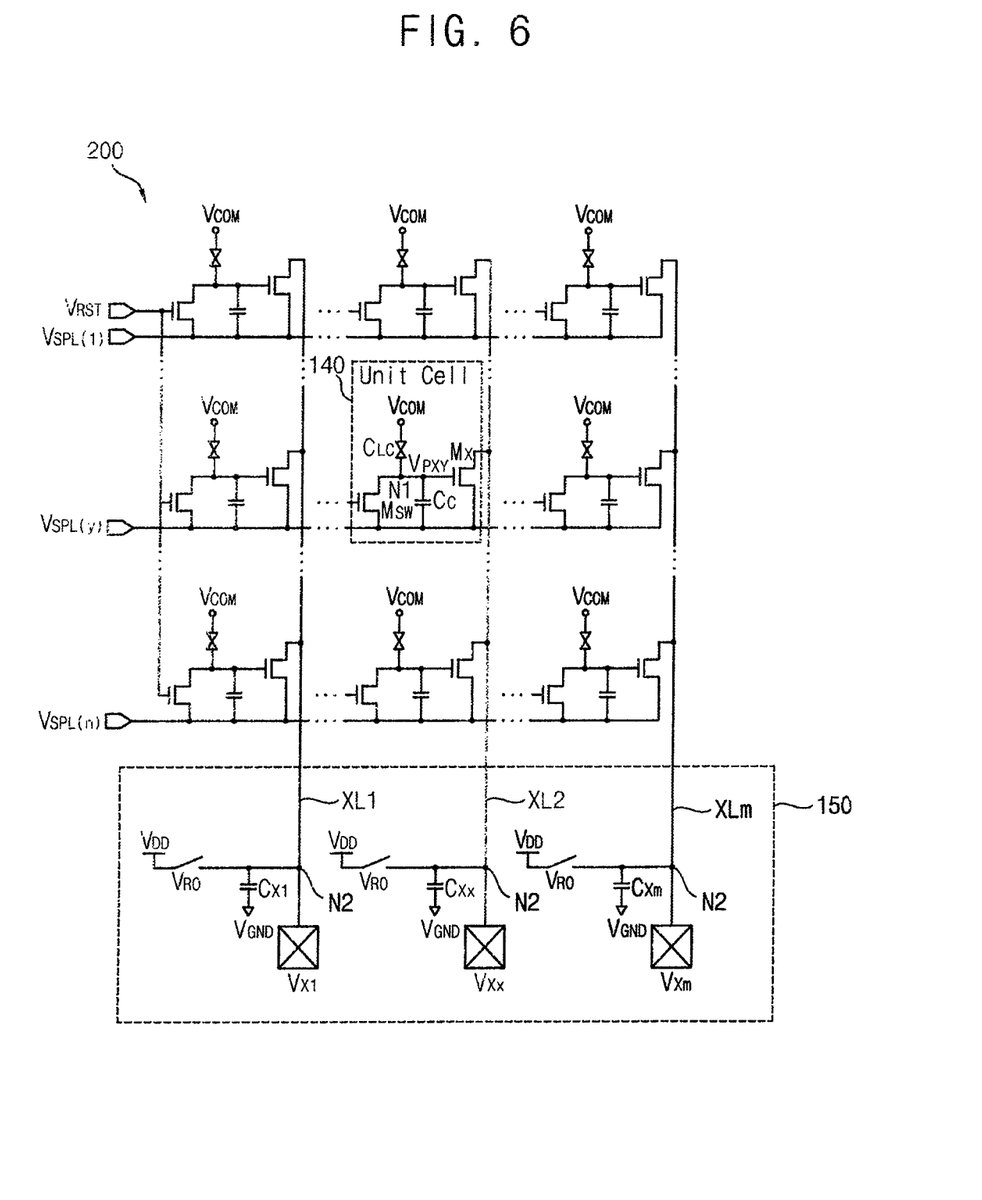
FIG. 6 is a circuit diagram showing a touch sensor according to an exemplary embodiment of the present invention.
Figure 7:
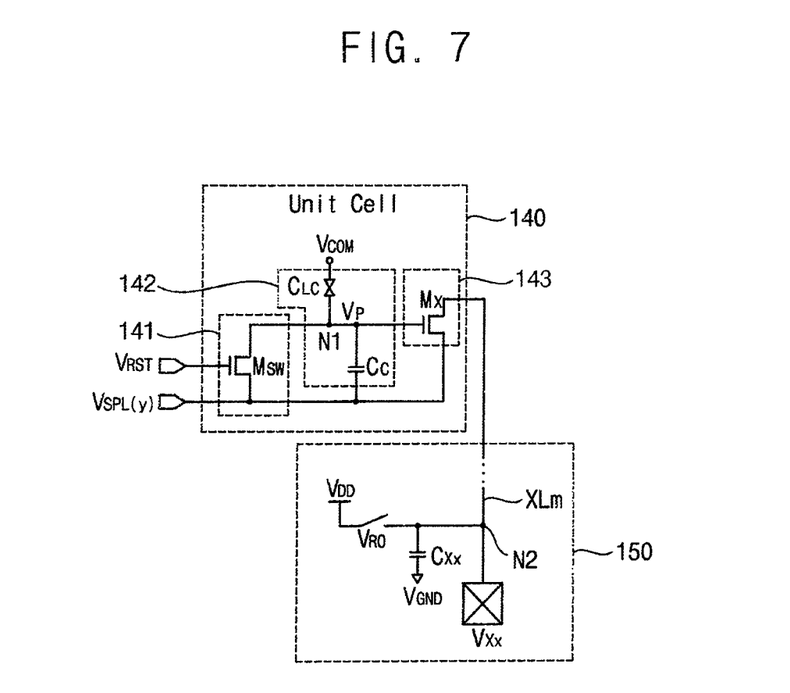
FIG. 7 is a circuit diagram showing a sensor unit and a first line reset unit of FIG. 6.
Figure 8:
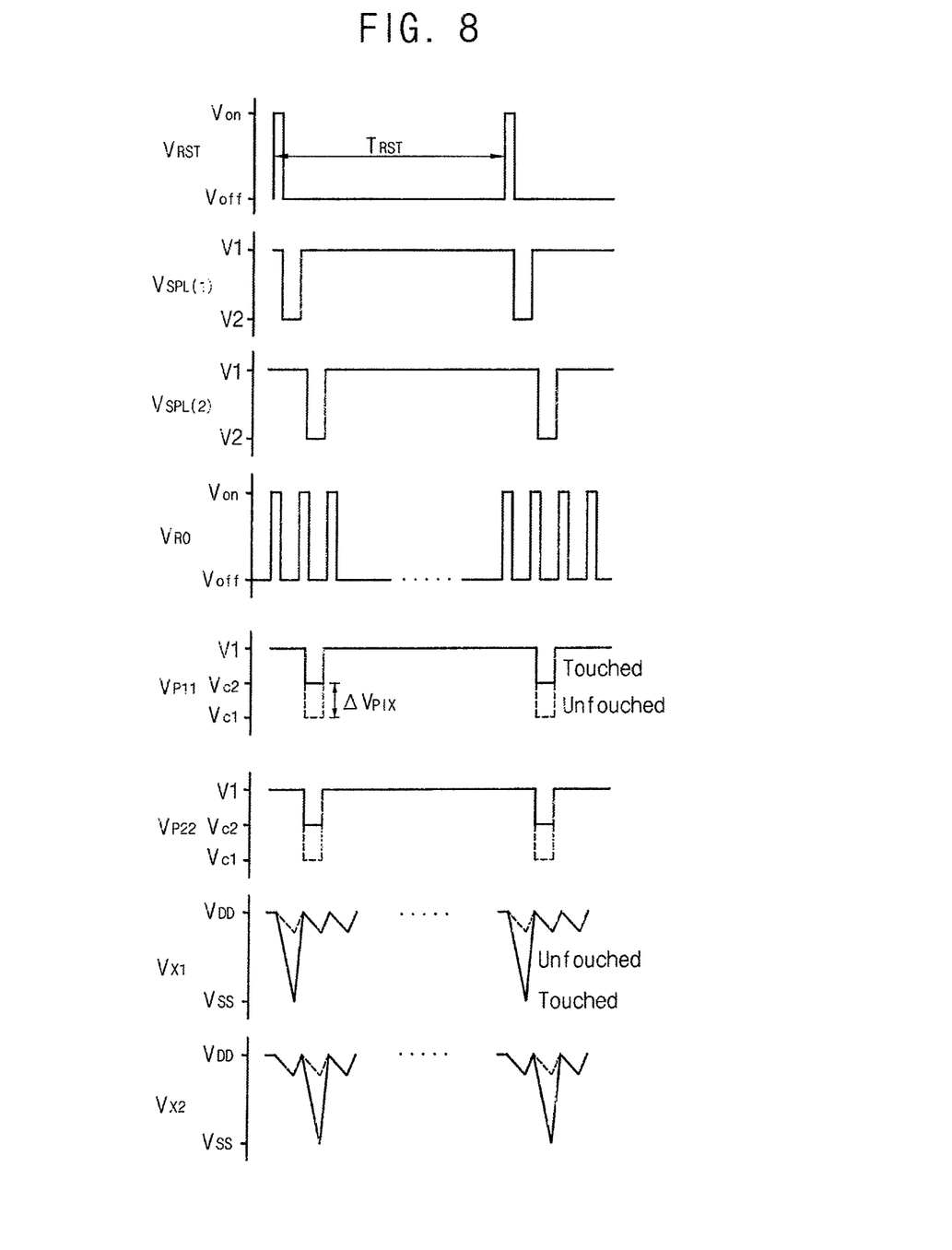
FIG. 8 is an exemplary timing diagram showing waveforms of signals of FIG. 7.

FIG. 6 is a circuit diagram showing a touch sensor 200 according to an exemplary embodiment of the present invention. FIG. 7 is a circuit diagram showing a sensor unit and first line reset unit of FIG. 6 and FIG. 8 is an exemplary timing diagram showing waveforms of signals of FIG. 7.

In FIG. 6, the same reference numerals denote the same elements in FIG. 1, and thus a detailed description of the same elements will be omitted to avoid redundancy.

Referring to FIG. 6, a touch sensor 200 includes a plurality of x-axis read-out lines XL1 to XLm and a plurality of sensor units 140. Each of the sensor units 140 includes a reset unit 141, a capacitance detector 142, and a first output unit 143.

Each of a plurality of sampling voltage $V_{SPL}$ supplying lines is connected to the input terminal of a respective one of the output units 143 (e.g., transistor Mx). In this embodiment, a separate sampling voltage ($V_{SPL(1)}$-$V_{SPL(n)}$) is supplied to each row of the touch sensor 200, which differs from the embodiment shown in FIG. 1, which shows a single sampling voltage ($V_{SPL}$) being applied to all rows of the touch sensor 100. Through this structure, sampling voltages $V_{SPL}$ can be applied to the sensor units 140 formed in a horizontal direction in a different timing so that a scanning readout driving method can be applied to omit y-axis read out lines YL1 to YLn and second line reset units.

Each of the sampling voltages $V_{SPL}$ having a timing difference for one horizontal time corresponding to each of the horizontal lines may be applied to the sensor units 140 formed in the same horizontal direction.

The sensor unit 140 includes a first transistor Msw having a control terminal (e.g., gate terminal) receiving the reset voltage $V_{RST}$, an input terminal receiving the sampling voltage $V_{SPL}(1)$~$V_{SPL}(n)$, and an output terminal connected to a first node N1. The first node N1 is connected to a control terminal (e.g., gate terminal) of the first output unit 143 (e.g., transistor Mx), a liquid crystal capacitor $C_{LC}$, and a coupling capacitor Cc. The liquid crystal capacitor $C_{LC}$ may be formed in a liquid crystal panel.

The electric potential $V_{N1}$ of the first node N1 has a first potential V1 of the sampling voltage $V_{SPL}$ during the high duration of the reset voltage $V_{RST}$ at an initial period, and when the first transistor Msw is turned off and the sampling voltage $V_{SPL}$ is lowered to a second potential V2, a difference of the electric potential $V_{N1}$ of the first node N1 ΔVpix (=$V_{G2}$-$V_{G1}$) may be induced through touch events.

The difference of the electric potential of the first node ΔVpix induces change of drain current Id of the first output unit 143 (e.g., transistor Mx) by which touch events can be sensed.

A touch sensor unit 140 according to an exemplary embodiment of present invention includes first line rest units 150 connected to x-axis read-out lines XL1 to XLm.

The first reset units 150 include switching units and a parasitic capacitor Cx, which output a first source supply voltage $V_{DD}$ to the x-axis read-out lines XL1 to XLm based on a read-out clock voltage $V_{RO}$. The capacitance of the parasitic capacitor Cx is larger than that of the liquid crystal capacitor $C_{LC}$.

The read-out clock voltage $V_{RO}$ may have a first voltage level V1 and a second voltage level V2 within one horizontal period alternately to cause the parasitic capacitor Cx to have the first source supply voltage $V_{DD}$ for every single horizontal period.

As shown in FIG. 8, switching elements formed in the first reset units 150 are turned on during a high duration of the read-out clock voltage $V_{RO}$ so that some electron charges are charged to the parasitic capacitor Cx initially.

When a touch event occurs at a point within an area of a sensor unit 140, the drain current of the corresponding the first output unit 143 (e.g., transistor Mx) increases so that the quantity of charges in the parasitic capacitor Cx connected to the corresponding x-axis read-out line is reduced. Through this process, touch events can be detected for every single horizontal period.

Although exemplary embodiments of the present invention have been described, it is understood that the present invention is not be limited to these exemplary embodiments, but various changes and modifications can be made by one ordinary skilled in the art within the spirit and scope of the present disclosure.

What is claimed is:

1. A liquid crystal display panel comprising a touch sensor, the touch sensor comprising:
   a plurality of x-axis read-out lines;

a plurality of y-axis read-out lines crossing the x-axis read-out lines; and a plurality of sensor units provided in a plurality of regions defined by the x-axis read-out lines and the y-axis read-out lines, wherein each sensor unit comprises:

a first transistor comprising a control terminal receiving a reset voltage and an input terminal receiving a sampling voltage, wherein the reset voltage and the sampling voltage are periodic signals having a same period and are in phase with one another during the entire period;

a capacitance detector that generates a modified sampling voltage from the sampling voltage based on a variation of a cell gap of the display panel caused by a touch to the display panel;

a first output unit that changes an electric potential of a corresponding x-axis read-out line in response to the modified sampling voltage; and a second output unit that changes an electric potential of a corresponding y-axis read-out line in response to the modified sampling voltage.

2. The liquid crystal panel of claim 1, wherein the capacitance detector comprises a liquid crystal capacitor, and the liquid crystal capacitor comprises a first electrode, which is connected to a node connecting a control terminal of the first and second output units to an output terminal of the first transistor, and a second electrode receiving a common voltage.

3. The liquid crystal panel of claim 2, wherein the first output unit comprises a second transistor comprising a control terminal connected to an output terminal of the first transistor, an input terminal receiving the modified sampling voltage and an output terminal connected to the x-axis read-out line, and the second output unit comprises a third transistor comprising a control terminal connected to the output terminal of the first transistor, an input terminal receiving the modified sampling voltage and an output terminal connected to the y-axis read-out line.

4. The liquid crystal panel of claim 2, wherein the capacitance detector further comprises a coupling capacitor comprising a first electrode connected to the node and a second electrode connected to a terminal receiving the sampling voltage.

5. The liquid crystal panel of claim 1, wherein the reset voltage has a period identical to a period of the sampling voltage.

6. The liquid crystal panel of claim 1, further comprising:

a plurality of first line reset units that output a first source supply voltage to the x-axis read-out lines based on the reset voltage; and a plurality of second line reset units that output the first source supply voltage to the y-axis read-out lines based on the reset voltage.

7. The liquid crystal panel of claim 6, wherein each first line reset unit comprises a fourth transistor comprising a control terminal receiving the reset voltage, an input terminal receiving the first source supply voltage, and an output terminal connected to the corresponding x-axis read-out line of the x-axis read-out lines, and each second line reset unit comprises a fifth transistor comprising a control terminal receiving the reset voltage, an input terminal receiving the first source supply voltage, and an output terminal connected to the corresponding y-axis read-out line of the y-axis read-out lines.

8. The liquid crystal panel of claim 6, further comprising a coordinate detection circuit detecting coordinates of a point at which the touch occurs.

9. The liquid crystal panel of claim 8, wherein the coordinate detection circuit comprises:

an x-axis comparator that is connected to the x-axis read-out lines, and compares signals output from the x-axis read-out lines with a preset reference signal to output a first comparative signal;

a y-axis comparator that is connected to the y-axis read-out lines, and compares signals output from the y-axis read-out lines with the preset reference signal to output a second comparative signal; and a coordinate generator that generates coordinates of a point, at which the touch occurs, based on the first and second comparative signals.

10. A liquid crystal display panel comprising:

a plurality of sensor units configured to detect touches to the display panel;

a coordinate detection circuit connected to the plurality of sensor units and configured to detect coordinates of a point at which the touch occurs; and a plurality of read-out lines configured to apply an output voltage of the plurality of the sensor units to the coordinate detection circuit, wherein each sensor unit comprises:

a first transistor comprising a control terminal receiving a reset voltage and an input terminal receiving a sampling voltage that is different from the reset voltage;

a capacitance detector that generates a modified sampling voltage from the sampling voltage based on a variation of a cell gap of the display panel caused by the touch; and an output unit that changes an electric potential of a corresponding read-out line in response to the modified sampling voltage, wherein the reset voltage is commonly applied to all the control terminals of the first transistors in the plurality of sensor units, and the sampling voltages applied to each of the input terminals of the first transistors in the sensor units located in the same row are out of phase with one another, respectively, wherein a signal line providing the reset voltage is distinct from sampling voltage lines providing the sampling voltages.

11. The liquid crystal display panel of claim 10, wherein the capacitance detector comprises a liquid crystal capacitor formed in the liquid crystal panel, and the liquid crystal capacitor comprises a first electrode connected to a node which connects a control terminal of the output unit and an output terminal of the reset unit and a second electrode receiving a common voltage.

12. The liquid crystal display panel of claim 11, wherein the capacitance detector further comprises a coupling capacitor comprising a first electrode connected to the node and a second electrode connected to a terminal receiving the sampling voltage.

13. The liquid crystal display panel of claim 10, wherein the output unit comprises a second transistor comprising a control terminal connected to the output terminal of the first transistor, an input terminal thereof receiving the modified sampling voltage and an output terminal thereof connected to the read-out line.

14. The liquid crystal display panel of claim 10, wherein the sampling voltages applied to each of the input terminals of the first transistors in the sensor units located in the same row have a same period.

15. The liquid crystal display panel of claim 10, further comprising a plurality of line reset units connected to the plurality of read-out lines and applying the output voltage of the sensor units to the coordinate detection circuit, wherein each of the line reset units comprises a switching unit and a parasitic capacitor outputting a first source supply voltage to a corresponding read-out line based on a read-out clock voltage.

16. The liquid crystal display panel of claim 15, wherein the read-out clock voltage has a first voltage level and a second voltage level within one horizontal period alternately to charge the parasitic capacitor to the first source supply voltage at an initial period for every single horizontal period.

17. The liquid crystal display panel of claim 10, wherein the coordinate detection circuit comprises:
 a comparator that is connected to the read-out lines, and compares signals output from the read-out lines with a preset reference signal to output a first comparative signal; and
 a coordinate generator that generates coordinates of a point, at which the touch occurs, based on the first comparative signal.

18. The liquid crystal display panel of claim 10, wherein the reset voltage is different from all the sampling voltages.

19. A liquid crystal display panel comprising a touch sensor, the touch sensor comprising:
 a plurality of read-out lines;
 a plurality of sensor units arranged in rows and configured to detect a touch to the display panel;
 a plurality of sampling voltage lines, wherein a corresponding one of the sampling voltage lines is connected to a single unique row of the sensor units, and supplies sampling voltages that are out of phase with one another, to all sensor units of the row,
 wherein each sensor unit comprises:
  a reset unit comprising a transistor comprising a control terminal that receives the sampling voltage from a corresponding one of the sampling voltage lines and an input terminal that receives a reset voltage, and outputs the sampling voltage based on the reset voltage;
  a capacitance detector that generates a modified sampling voltage from the sampling voltage based on a variation of a cell gap of the display panel caused by the touch; and
  an output unit that changes an electric potential of a corresponding read-out line in response to the modified sampling voltage, wherein the touch sensor is disposed on a thin film transistor substrate of the liquid crystal display panel, wherein the reset voltage is different from all the sampling voltages.

20. The liquid crystal display panel of claim 19, wherein the reset voltage is commonly applied to the reset units in the plurality of sensor units.

21. The liquid crystal display panel of claim 19, wherein the capacitance detector comprises:
 a liquid crystal capacitor, a first electrode of the liquid crystal capacitor connected to a node which connects a control terminal of the output unit and an output terminal of the reset unit and a second electrode receiving a common voltage; and
 a coupling capacitor comprising a first electrode connected to the node and a second electrode connected to a terminal receiving the sampling voltage.

22. The liquid crystal display panel of claim 19, wherein each reset unit in a same row is a transistor comprising a control terminal receiving the same reset voltage and an input terminal receiving a different one of the sampling voltages.

23. The liquid crystal display panel of claim 19, wherein a signal line proving the reset voltage is distinct from the sampling voltage lines.

* * * * *

UNITED STATES PATENT AND TRADEMARK OFFICE
CERTIFICATE OF CORRECTION

| | | |
|---|---|---|
| PATENT NO. | : 8,928,599 B2 | Page 1 of 1 |
| APPLICATION NO. | : 12/814818 | |
| DATED | : January 6, 2015 | |
| INVENTOR(S) | : Byoung-Jun Lee et al. | |

It is certified that error appears in the above-identified patent and that said Letters Patent is hereby corrected as shown below:

TITLE PAGE: ITEM 30 insert

--Foreign Application Priority Data

Sep. 10, 2009   (KR)..................... 10-2009-0085471--

Signed and Sealed this
Thirty-first Day of March, 2015

Michelle K. Lee
*Director of the United States Patent and Trademark Office*